(12) United States Patent
Araki et al.

(10) Patent No.: US 11,949,288 B2
(45) Date of Patent: Apr. 2, 2024

(54) WHEEL DRIVE DEVICE AND ELECTRIC VEHICLE PROVIDED WITH THE SAME

(71) Applicant: Hitachi Astemo, Ltd., Hitachinaka (JP)

(72) Inventors: Takahiro Araki, Tokyo (JP); Kinya Nakatsu, Tokyo (JP); Takayoshi Nakamura, Tokyo (JP); Akihiro Namba, Tokyo (JP); Hiroyuki Ooiwa, Hitachinaka (JP); Hideki Miyazaki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 423 days.

(21) Appl. No.: 17/420,831

(22) PCT Filed: Jan. 8, 2020

(86) PCT No.: PCT/JP2020/000228
§ 371 (c)(1),
(2) Date: Jul. 6, 2021

(87) PCT Pub. No.: WO2020/158312
PCT Pub. Date: Aug. 6, 2020

(65) Prior Publication Data
US 2022/0077731 A1 Mar. 10, 2022

(30) Foreign Application Priority Data
Jan. 31, 2019 (JP) ................................ 2019-015116

(51) Int. Cl.
*H02K 1/20* (2006.01)
*B60L 58/26* (2019.01)
(Continued)

(52) U.S. Cl.
CPC ................ *H02K 1/20* (2013.01); *B60L 58/26* (2019.02); *H02K 7/006* (2013.01); *H02K 9/19* (2013.01);
(Continued)

(58) Field of Classification Search
CPC ............ H02K 1/20; H02K 1/32; H02K 7/006; H02K 9/19; H02K 1/2786; H02K 1/33; H02K 11/0094
See application file for complete search history.

(56) References Cited

U.S. PATENT DOCUMENTS

2017/0085149 A1 3/2017 Osterlaenger et al.
2020/0164735 A1* 5/2020 Van Der Wal ......... H02K 29/06

FOREIGN PATENT DOCUMENTS

JP 2010-213403 A 9/2010
JP 2014-213622 A 11/2014
(Continued)

OTHER PUBLICATIONS

International Search Report with English translation and Written Opinion issued in corresponding application No. PCT/JP2020/000228 dated Apr. 14, 2020.

*Primary Examiner* — Robert W Horn
(74) *Attorney, Agent, or Firm* — Foley & Lardner LLP

(57) ABSTRACT

An object of the present invention is to provide a wheel drive device capable of suppressing a temperature increase in an electric motor and a power conversion device and suppressing occurrence of a failure of an electric component. Provided are: an electric motor having a stator 60 and a rotor 40; a stator holder 80 that holds the stator 60; a power conversion device 100 that converts power supplied to the electric motor; and a wheel which accommodates the electric motor, the stator holder 80, and the power conversion device 100 on the inner peripheral side. The stator holder 80 includes a flow path 90 through which a cooling medium flows. The flow path 90 is arranged between the stator 60 and the power conversion device 100.

8 Claims, 6 Drawing Sheets

(51) Int. Cl.
*H02K 7/00* (2006.01)
*H02K 9/19* (2006.01)
*H02K 11/00* (2016.01)
*H02K 11/33* (2016.01)

(52) U.S. Cl.
CPC ......... *H02K 11/0094* (2013.01); *H02K 11/33* (2016.01)

(56) References Cited

FOREIGN PATENT DOCUMENTS

| | | | | | |
|---|---|---|---|---|---|
| JP | 2015-146704 A | | 8/2015 | | |
| JP | 2019011041 A | * | 1/2019 | ............. | B60K 11/00 |
| JP | 2023061299 A | * | 5/2023 | | |
| WO | WO-2022153689 A1 | * | 7/2022 | | |

* cited by examiner

WHEEL DRIVE DEVICE AND ELECTRIC VEHICLE PROVIDED WITH THE SAME

TECHNICAL FIELD

The present invention relates to a wheel drive device in which an electric motor is mounted in a wheel and an electric vehicle provided with the same.

BACKGROUND ART

There is a demand for installation of electric drive systems of hybrid vehicles or an electric vehicle in a wheel in order to expand the vehicle interior space. In response to such a demand, a technique of mounting an electric motor and a power conversion device in a wheel has been proposed. An example of such a technique is PTL 1.

In PTL 1, an electric motor includes a stator and a rotor provided in a wheel section. An inverter device that supplies power to a rotating machine is provided in the wheel section. The stator and the rotor form an annular shape, and the inverter device is provided in a space portion formed inside the annular shape. The inverter device is provided with a heat radiating plate such that heat generated by the inverter device is discharged to the outside through the heat radiating plate.

CITATION LIST

Patent Literature

PTL 1: JP 2014-213622 A

SUMMARY OF INVENTION

Technical Problem

In the case where the electric motor and the inverter device are provided in the wheel section, not only the inverter device but also the electric motor generates heat, and thus, it is necessary to cool the electric motor in addition to the inverter device. If the electric motor is not sufficiently cooled, a temperature of the inverter device increases due to the heat generated by the electric motor, which may shorten the life of an electric component or cause a failure. In the technique described in PTL 1, the inverter device is cooled by an air cooling system using the heat radiating plate, but the cooling performance for the amount of generated heat including the cooling of the electric motor is insufficient, which may shorten the life of the electrical component and cause the failure.

An object of the present invention is to provide a wheel drive device capable of suppressing a temperature increase in an electric motor and a power conversion device and suppressing occurrence of a failure of an electric component.

Solution to Problem

In order to achieve the above object, the present invention provides a wheel drive device including: an electric motor with a stator and a rotor; a stator holder that holds the stator; a power conversion device that converts power supplied to the electric motor; and a wheel that accommodates the electric motor, the stator holder, and the power conversion device on an inner peripheral side, the stator holder including a flow path through which a cooling medium flows, and the flow path being arranged between the stator and the power conversion device.

Advantageous Effects of Invention

According to the present invention, it is possible to provide the wheel drive device capable of suppressing the temperature increase in the electric motor and the power conversion device and suppressing the occurrence of the failure the an electric component.

DESCRIPTION OF EMBODIMENTS

Hereinafter, embodiments of the present invention will be described with reference to the drawings. Meanwhile, the present invention is not construed to be limited to the embodiments, and a technical idea of the present invention may be implemented by combining other well-known constituent elements. Incidentally, the same elements will be denoted by the same reference signs in the respective drawings, and the redundant description thereof will be omitted. In each embodiment, an axial direction means the same direction as a rotary shaft 30, and a radial direction means a direction orthogonal to the rotary shaft 30.

First Embodiment

Figure 1:
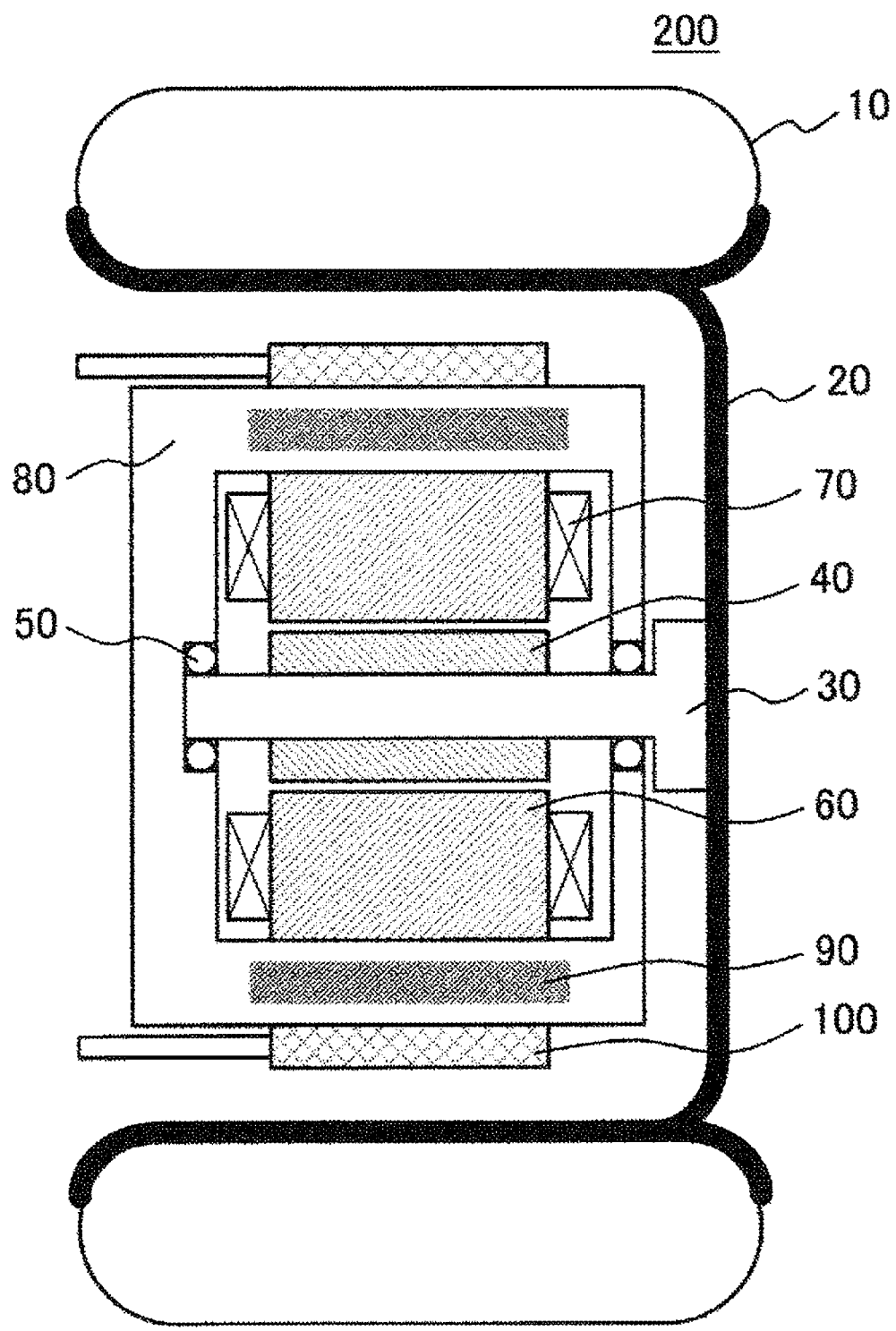
FIG. 1 is a diagram illustrating an outline of a wheel drive device according to a first embodiment of the present invention.

A first embodiment of the present invention will be described with reference to FIG. 1. FIG. 1 is a diagram illustrating an outline of a wheel drive device according to the first embodiment of the present invention. In FIG. 1, an electric motor includes: the rotary shaft 30; a rotor 40 fixed to the rotary shaft 30; a bearing 50 that rotatably supports both sides of the rotary shaft 30; a stator 60 arranged on the outer peripheral side of the rotor 40; a coil 70 wound on a slot of the stator 60; and a stator holder 80 that holds the stator 60 and forms an outer shell of the electric motor, and is arranged on the inner peripheral side (inner in the radial direction) of a wheel 20. With these configurations, a wheel drive device 200 is configured.

A tire 10 is attached to the radially outer side (outer peripheral side) of the wheel 20. The wheel 20 is fixed to a side surface in a rotation-axis direction of the rotary shaft 30 by a bolt, a nut, or the like.

The rotary shaft 30 is supported by the bearing 50 and rotates in the circumferential direction. The rotor 40 made of a magnetic material, such as an electromagnetic steel plate, is attached in the radial direction of the rotary shaft 30, and the stator 60 are arranged concentrically.

The stator 60 is held by the stator holder 80. The coil 70 is formed by winding a conductor, such as a copper wire, around a teeth portion of the stator 60.

A power conversion device 100 is attached to the stator holder 80, and an output terminal of the power conversion device 100 is connected to a terminal of the coil 70.

An input terminal of the power conversion device 100 is connected to a battery (not illustrated), and the battery supplies electric energy required to drive the electric motor. The power conversion device 100 converts power supplied from the battery from direct current to alternating current, and supplies the converted power to the electric motor. In the electric motor, the current flowing through the coil 70 is controlled by a control device (not illustrated), and the stator 60 generates a rotating magnetic field to generate a rotational torque in the rotor 40.

The stator holder 80 is fixed to a vehicle via a knuckle or the like (not illustrated). The stator holder 80 is made of metal such as aluminum having excellent thermal conductivity, and a cylindrical flow path 90 is provided between the stator 60 and the power conversion device 100.

The flow path 90 is filled with a cooling medium such as water (coolant) or oil, and the cooling medium is circulated by a pump (not illustrated). In order to keep a temperature of the cooling medium lower than those of the stator 60 and the power conversion device 100, the cooling medium is cooled by a radiator (not illustrated) or the like.

In the first embodiment, the flow path through which the cooling medium flows is provided between the stator 60 and the power conversion device 100. According to the first embodiment, heat generated by the stator 60 and the coil 70 is cooled by the cooling medium flowing through the flow path 90 before being transferred to the power conversion device 100 via the stator holder 80, and thus, it is possible to cool the electric motor and suppress a temperature increase in the power conversion device.

Second Embodiment

Figure 2:
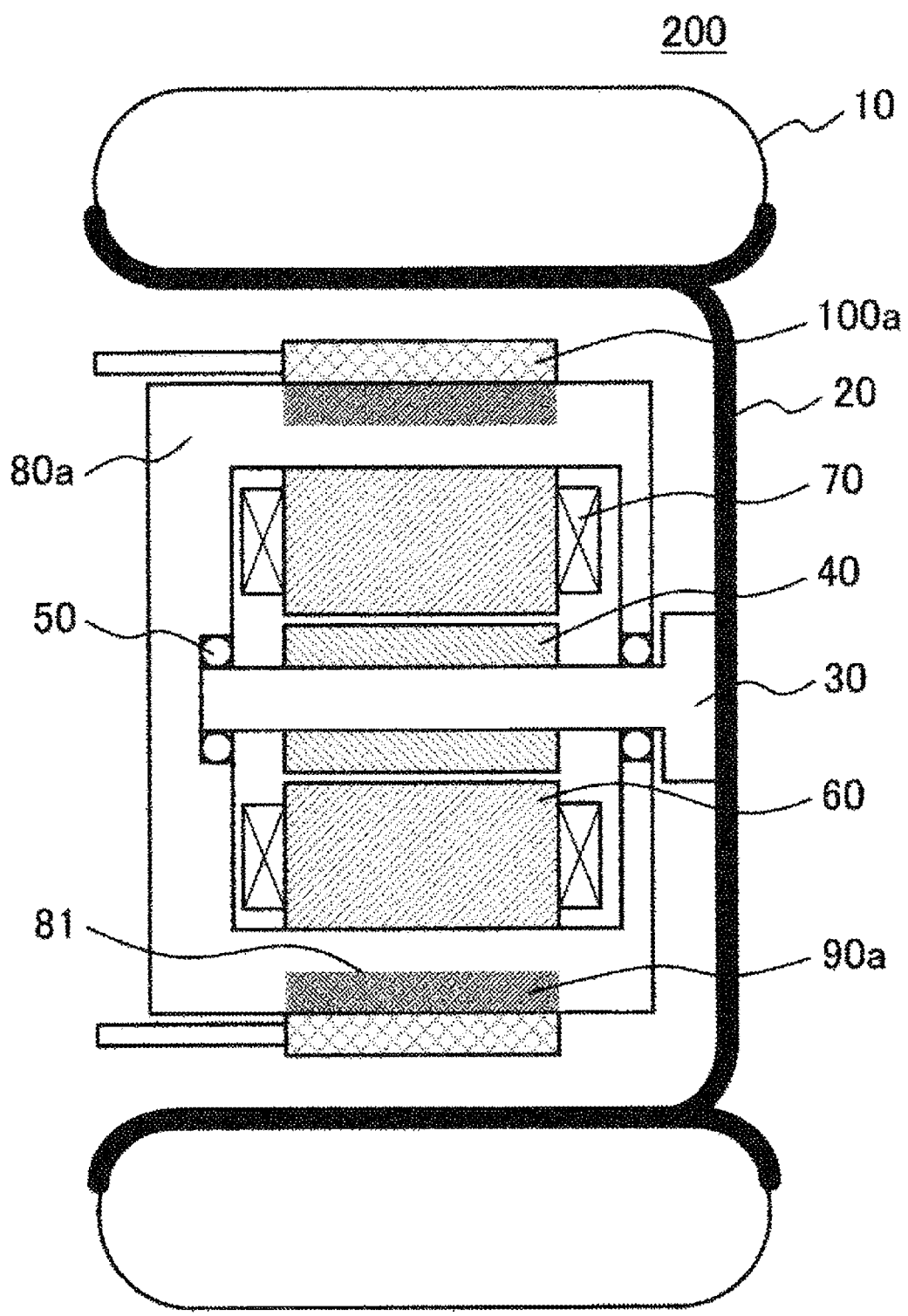
FIG. 2 is a diagram illustrating an outline of a wheel drive device according to a second embodiment of the present invention.

Next, a second embodiment of the present invention will be described with reference to FIG. 2. FIG. 2 is a diagram illustrating an outline of a wheel drive device according to the second embodiment of the present invention. The same configurations as those in the first embodiment will be denoted by the same reference signs, and the detailed description thereof will be omitted. In the wheel drive device 200 of the second embodiment, a flow path 90a is formed on a circumferential surface of a stator holder 80a. A concave portion 81, which substantially makes a round in the circumferential direction and is recessed from an outer peripheral surface to the radially inner side, is formed on the outer circumference of the stator holder 80a, and a power conversion device 100a is arranged on the radially outer side (outer peripheral side) of the concave portion 81. The outer circumference of the power conversion device 100a is covered with a case. The case that covers the power conversion device 100a has a ring shape when viewed in the axial direction, and the inner peripheral side (radially inner side) of the ring-shaped case is arranged so as to close an opening of the concave portion 81, thereby forming the flow path 90a. That is, the flow path 90a is formed by the concave portion 81 of the stator holder 80a and the case of the power conversion device 100a. Then, the flow path 90a is arranged such that a cooling surface of the power conversion device 100a is in direct contact with a cooling medium. The power conversion device 100a is not arranged all over the inside of the case, but is divided into one or a plurality of pieces and appropriately arranged in the case. An end where the stator holder 80a and the case of the power conversion device 100a come into contact with each other is sealed with a sealing material such as an O-ring such that the cooling medium does not leak.

According to the second embodiment, the cooling surface of the power conversion device 100a is in direct contact with the cooling medium, it is possible to obtain a higher cooling effect with respect to the power conversion device 100a.

Third Embodiment

Figure 3:
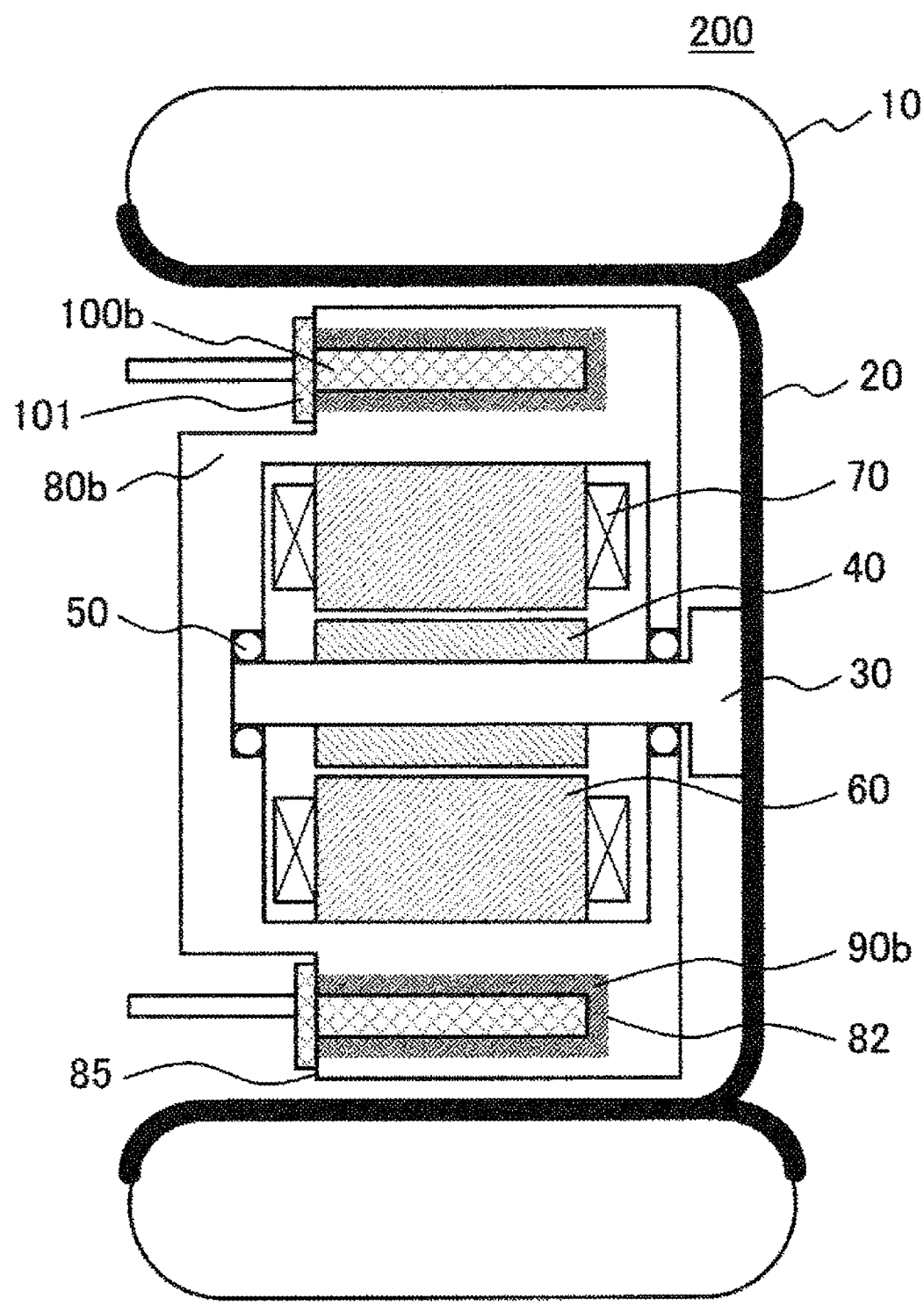
FIG. 3 is a diagram illustrating an outline of a wheel drive device according to a third embodiment of the present invention.

Next, a third embodiment of the present invention will be described with reference to FIG. 3. FIG. 3 is a diagram illustrating an outline of a wheel drive device according to the third embodiment of the present invention. The same configurations as those in the first embodiment will be denoted by the same reference signs, and the detailed description thereof will be omitted. In the wheel drive device 200 of the third embodiment, a power conversion device 100b has a plurality of cooling surfaces, and the two or more cooling surfaces are in direct contact with a cooling medium.

A stator holder 80b is formed with a concave portion 82 recessed from an axial end 85 of the stator holder 80b to the axially inner side. The concave portion 82 is formed in an annular shape with the rotary shaft 30 as the center. The power conversion device 100b covered with a case is inserted into the concave portion 82. The axial length (depth) of the concave portion 82 is formed to be longer (deeper) than that of the power conversion device 100b.

A lid member 101 larger than an opening area of the concave portion 82 at the axial end 85 of the stator holder 80b is attached to the power conversion device 100b. The lid member 101 is formed in an annular shape with the rotary shaft 30 as the center. When the power conversion device 100b is inserted into the concave portion 82, the lid member 101, which is a terminal surface of the power conversion device 100b, comes into contact with the axial end 85 of the stator holder 80b to close an opening of the concave portion 82. An end where the stator holder 80b and the lid member 101 come into contact with each other is sealed by a sealing material such as an O-ring such that the cooling medium does not leak. A flow path 90b is formed by the concave portion 82 of the stator holder 80b and the lid member 101. The power conversion device 100b is submerged in the flow path 90b, and peripheries of the cooling surfaces of the power conversion device 100b are covered by the flow path 90b.

The power conversion device 100b covered with the case is divided into one or a plurality of pieces and housed in the concave portion 82. The power conversion device 100b covered with the case has the plurality of cooling surfaces. When the case is formed in a square cylinder shape, for example, a total of five surfaces including four surface in the circumferential direction and one surface in the axial direction serve as the cooling surfaces that come into direct contact with the cooling medium. In a case of a cylindrical shape, a total of two surfaces including one surface in the circumferential direction and one surface in the axial direction serve as the cooling surfaces that come into direct contact with the cooling medium. Therefore, at least two or more cooling surfaces are in direct contact with the cooling medium in the power conversion device 100*b*.

According to the third embodiment, contact surfaces between the stator holder 80*b* and the power conversion device 100*b* decrease, and thus, it is possible to further reduce heat transferred to the power conversion device 100*b* via the stator holder 80*b*. Further, the contact surfaces between the power conversion device 100*b* and the cooling medium increase, and thus, the power conversion device 100*b* can obtain a higher cooling effect.

Fourth Embodiment

Figure 4:
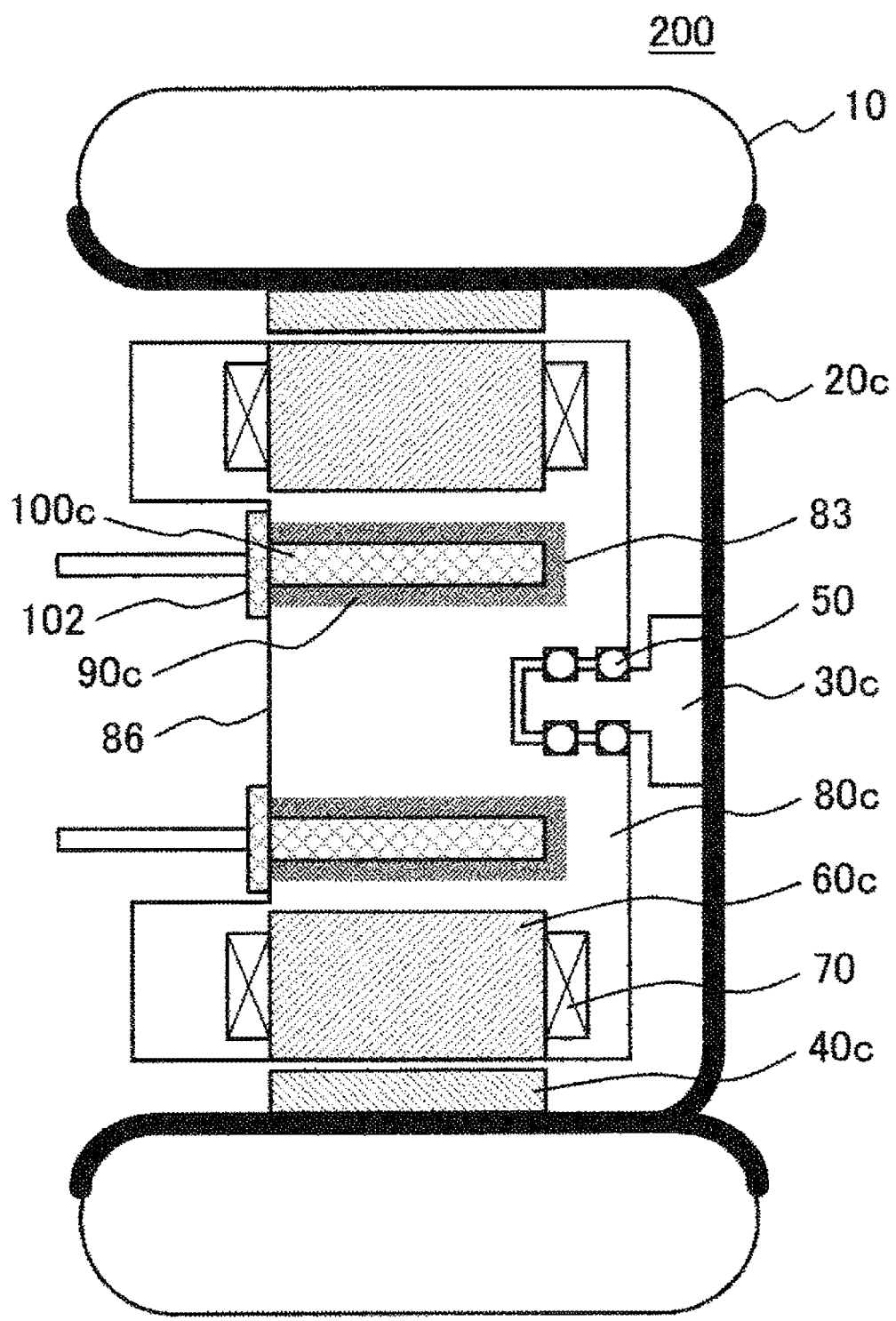
FIG. 4 is a diagram illustrating an outline of a wheel drive device according to a fourth embodiment of the present invention.

Next, a fourth embodiment of the present invention will be described with reference to FIG. 4. FIG. 4 is a diagram illustrating an outline of a wheel drive device according to the fourth embodiment of the present invention. Although an inner rotor type has been given as an example in the first to third embodiments, but an outer rotor type is given as an example in the fourth embodiment. In the fourth embodiment, a stator 60*c* arranged on a stator holder 80*c* is arranged so as to come into contact with an outer peripheral surface of the stator holder 80*c* on the radially outer side. A rotor 40*c* is fixed inside a wheel 20*c* and opposes the stator 60*c*. A rotary shaft 30*c* is fixed to the wheel 20*c* and is held by the stator holder 80*c* via the bearing 50.

The stator holder 80*c* is formed with a concave portion 83 recessed from an axial end 86 of the stator holder 80*c* to the axially inner side. The concave portion 83 is formed in an annular shape with the rotary shaft 30 as the center. The concave portion 83 is provided on the inner peripheral side (radially inner side) of the stator 60*c*. The power conversion device 100*c* covered with a case is inserted into the concave portion 83. The axial length (depth) of the concave portion 83 is formed to be longer (deeper) than that of the power conversion device 100*c*.

A lid member 102 larger than an opening area of the concave portion 83 at the axial end 86 of the stator holder 80*c* is attached to the power conversion device 100*c*. The lid member 102 is formed in an annular shape with the rotary shaft 30 as the center. When the power conversion device 100*c* is inserted into the concave portion 83, the lid member 102, which is a terminal surface of the power conversion device 100*c*, comes into contact with the axial end 86 of the stator holder 80*c* to close an opening of the concave portion 83. An end where the stator holder 80*c* and the lid member 102 come into contact with each other is sealed by a sealing material such as an O-ring such that the cooling medium does not leak. A flow path 90*c* is formed by the concave portion 83 of the stator holder 80*c* and the lid member 102. The power conversion device 100*c* is submerged in the flow path 90*c*, and peripheries of the cooling surfaces of the power conversion device 100*c* are covered by the flow path 90*c*.

The power conversion device 100*c* covered with the case is divided into one or a plurality of pieces and housed in the concave portion 83. The power conversion device 100*c* covered with the case has the plurality of cooling surfaces. When the case is formed in a square cylinder shape, for example, a total of five surfaces including four surface in the circumferential direction and one surface in the axial direction serve as the cooling surfaces that come into direct contact with the cooling medium. In a case of a cylindrical shape, a total of two surfaces including one surface in the circumferential direction and one surface in the axial direction serve as the cooling surfaces that come into direct contact with the cooling medium. Therefore, at least two or more cooling surfaces are in direct contact with the cooling medium in the power conversion device 100*c*.

In the fourth embodiment, the flow path 90*c* housing the power conversion device 100*c* is arranged on the inner peripheral side (radially inner side) of the stator 60*c*, and thus, a flow path length is shorter than that of a flow path arranged on the radially outer side (outer peripheral side) of the stator.

According to the fourth embodiment, a circumferential length of the flow path 90*c* configured around the power conversion device 100*c* is shortened, and the total flow path length is shortened, so that the amount of the cooling medium can be reduced.

Note that a rotor holder that covers the rotor 40*c* so as to prevent entry of water or dust may be provided on the inner peripheral side of the rotor 40*c*, and the rotor 40*c* may be held by the rotary shaft 30*c* or the wheel 20*c* via the rotor holder.

Fifth Embodiment

Figure 5:
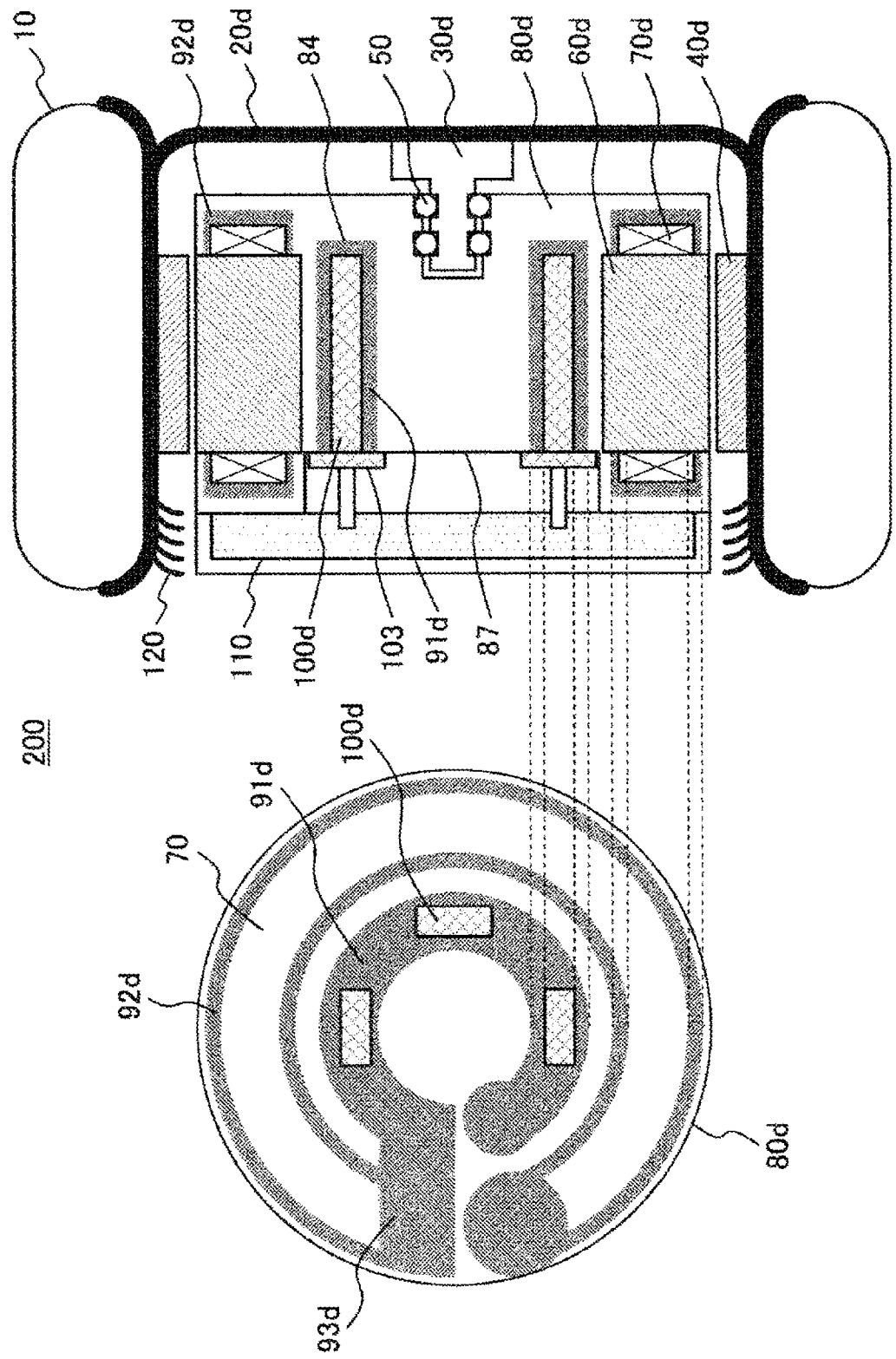
FIG. 5 is a diagram illustrating an outline of a wheel drive device according to a fifth embodiment of the present invention.

Next, a fifth embodiment of the present invention will be described with reference to FIG. 5. FIG. 5 is a diagram illustrating an outline of a wheel drive device according to the fifth embodiment of the present invention. A view on the left side of FIG. 5 is a view of an electric motor and a power conversion device when viewed in the axial direction. In the fifth embodiment, an outer rotor type will be given as an example similarly to the fourth embodiment. In the fifth embodiment, a stator 60*d* arranged on a stator holder 80*d* is arranged so as to come into contact with an outer peripheral surface of the stator holder 80*d* on the radially outer side. A rotor 40*d* is fixed to the inner peripheral side of a wheel 20*d*, and the stator 60*d* and a power conversion device 100*d* are arranged on the inner peripheral side of the rotor 40*d*. The rotor 40*d* fixed to the inner peripheral side of the wheel 20*d* and the stator 60*d* fixed to the stator holder 80*d* oppose each other with a gap therebetween. A rotary shaft 30*d* is fixed to the wheel 20*d* and is held by the stator holder 80*d* via the bearing 50.

The stator holder 80*d* is formed with a concave portion 84 recessed from an axial end 87 of the stator holder 80*d* to the axially inner side. The concave portion 84 is formed in an annular shape with the rotary shaft 30 as the center. The concave portion 84 is provided on the inner peripheral side (radially inner side) of the stator 60*d*. The power conversion device 100*d* covered with a case is inserted into the concave portion 84. The axial length (depth) of the concave portion 84 is formed to be longer (deeper) than that of the power conversion device 100*d*.

A lid member 103 larger than an opening area of the concave portion 84 at the axial end 87 of the stator holder 80*d* is attached to the power conversion device 100*d*. The lid member 103 is formed in an annular shape with the rotary shaft 30 as the center. When the power conversion device 100*d* is inserted into the concave portion 84, the lid member 103, which is a terminal surface of the power conversion device 100*d*, comes into contact with the axial end 87 of the stator holder 80*d* to close an opening of the concave portion 84. An end where the stator holder 80*d* and the lid member 103 come into contact with each other is sealed by a sealing material such as an O-ring such that the cooling medium does not leak. A first flow path 91*d* is formed by the concave portion 84 of the stator holder 80*d* and the lid member 103. The power conversion device 100*d* is submerged in the first flow path 91d, and peripheries of cooling surfaces of the power conversion device 100d is covered by the first flow path 91d.

The power conversion device 100d covered with the case is divided into one or a plurality of pieces and housed in the concave portion 84. The power conversion device 100d covered with the case has the plurality of cooling surfaces. When the case is formed in a square cylinder shape, for example, a total of five surfaces including four surface in the circumferential direction and one surface in the axial direction serve as the cooling surfaces that come into direct contact with the cooling medium. In a case of a cylindrical shape, a total of two surfaces including one surface in the circumferential direction and one surface in the axial direction serve as the cooling surfaces that come into direct contact with the cooling medium. Therefore, at least two or more cooling surfaces are in direct contact with the cooling medium in the power conversion device 100d.

In addition, in the fifth embodiment, a second flow path 92d is also provided around a coil 70c, in addition to the first flow path 91d formed around the power conversion device 100d.

The cooling medium flowing in the first flow path 91d and the second flow path 92d is first supplied to the first flow path 91d by a pump (not illustrated), and then flows out to the second flow path 92d.

The first flow path 91d cools all the power conversion devices 100d attached to the stator holder 80d, and thus, is formed in a cylindrical shape when the power conversion devices 100d are arranged concentrically about the rotary shaft 30d of the rotor 40d.

The second flow path 92d is connected to a terminal portion of the first flow path 91d and is formed in a cylindrical shape to cool the stator 60d and the coil 70d. The cooling medium flows in the circumferential direction, but flows between windings of the coil 70d or in a relay flow path 93d between an inner-peripheral-side flow path and an outer-peripheral-side flow path.

According to the fifth embodiment, the cooling medium having a lower temperature than the second flow path 92d for cooling the stator 60d and the coil 70d flows in the first flow path 91d for cooling the power conversion device 100d, and thus, a temperature increase in the power conversion device 100d can be further suppressed.

In addition, in FIG. 5, a battery 110 is arranged in a rotation-axis direction of any of the rotor 40d, the stator 60d, and the power conversion device 100d, and is fixed to the stator holder 80d.

The battery 110 is connected to the power conversion device 100d, and electric energy required to drive the electric motor is supplied from the battery 110. Note that, when there is insufficient space to mount the battery 110 on the inner peripheral side (radially inner side) of the wheel 20d, a battery may also be mounted on a vehicle body side, and electric energy may be supplied to the battery 110 by a power cable (not illustrated).

According to the fifth embodiment, heat of the power conversion device 100d is radiated by the first flow path 91c, and heat of the stator 60d and the coil 70d is radiated by the second flow path 92c. Thus, it is possible to suppress a temperature increase in the battery, and to arrange the battery having a heat resistant temperature lower than that of the power conversion device 100d or the electric motor inside the wheel. As a result, it is unnecessary to mount the battery on the vehicle body side, and the vehicle interior space can be expanded. In the fifth embodiment, in the case where the battery is mounted on the vehicle body side and electric energy is supplied to the battery 110 by the power cable, the operation of the electric motor can be continued even if the power cable is broken.

Further, a fan 120 is provided on the inner peripheral side (radially inner side) of the wheel 20d in the fifth embodiment. The fan 120 generates wind toward the stator holder 80d when the wheel 20d rotates, thereby cooling the battery 110 or the electric motor. This wind may be generated by the rotation of the wheel 20d or generated by guiding wind generated by traveling of the vehicle. In addition, the fan 120 may be fixed to the rotor 40d or fixed to a rotor holder that covers the rotor.

According to the fifth embodiment, the fan 120 provided on the inner peripheral side (radially inner side) of the wheel 20d allows the wind to flow to the battery 110 or the electric motor, and thus, the battery 110 or the electric motor can obtain a higher cooling effect.

Sixth Embodiment

Figure 6:
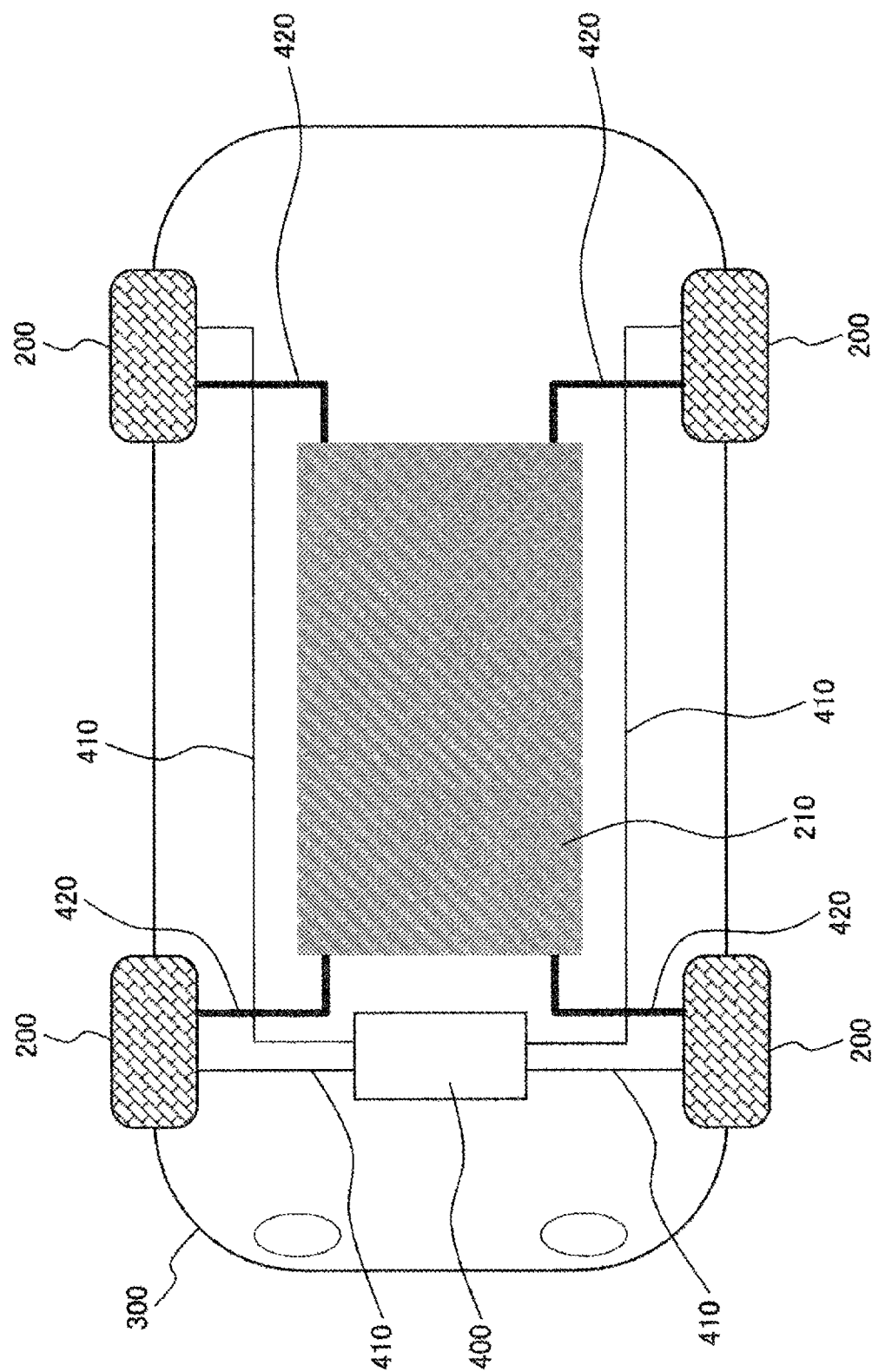
FIG. 6 is a diagram illustrating an outline of an electric vehicle equipped with a wheel drive device according to a sixth embodiment of the present invention.

Next, a sixth embodiment of the present invention will be described with reference to FIG. 6. FIG. 6 is a diagram illustrating an outline of an electric vehicle equipped with a wheel drive device according to the sixth embodiment of the present invention. In the fifth embodiment, a description will be given regarding an example in which the wheel drive device described in the first to fifth embodiments is mounted on an electric vehicle.

The wheel drive device 200 is mounted on two front wheels, two rear wheels, or all the four wheels of a vehicle 300. The vehicle 300 is equipped with a vehicle control device 400 that controls the vehicle. Driving force command signals are given to the wheel drive devices 200 from the vehicle control device 400 via communication lines 410, respectively. The wheel drive device 200 is controlled by this drive force command signal. The wheel drive devices 200 are driven by a large-capacity battery 210 mounted on the vehicle 300 as a power source. Power is supplied from the battery 210 to the wheel drive devices 200 via power lines 420, respectively. Note that a battery may be mounted in the wheel as described in the fourth embodiment.

According to the sixth embodiment, it is possible to provide the electric vehicle capable of cooling an electric motor and suppressing a temperature increase in a power conversion device.

As described above, the stator holder that holds the stator has the flow path through which the cooling medium flows, and the flow path is formed between the stator and the power conversion device according to the respective embodiments. Thus, it is possible to obtain the effects of achieving both the cooling of the electric motor and suppression of the temperature increase in the power conversion device and extending the life of the power conversion device.

REFERENCE SIGNS LIST 10 tire
20,20c,20d wheel
30,30c,30d rotary shaft
40,40c,40c,40d rotor
50 bearing
60,60c,60d stator
70,70c,70d coil
80,80a,80b,80c,80d stator holder
81,82,83,84 concave portion
85,86,87 axial end
90,90a,90b,90c flow path 91*d* first flow path
92*d* second flow path
93*d* relay flow path
100,100*a*,100*b*,100*c*,100*d* power conversion device
101,102,103 lid member
110,210 battery
120 fan
200 wheel drive device
300 vehicle
400 vehicle control device
410 communication line
420 power line

The invention claimed is:

1. A wheel drive device comprising:
an electric motor with a stator and a rotor;
a stator holder that holds the stator;
a power conversion device that converts power supplied to the electric motor; and
a wheel that accommodates the electric motor, the stator holder, and the power conversion device on an inner peripheral side,
wherein the stator holder includes a flow path through which a cooling medium flows, and
the flow path is arranged between the stator and the power conversion device.

2. The wheel drive device according to claim 1, wherein the flow path is arranged such that a cooling surface of the power conversion device comes into direct contact with the cooling medium.

3. The wheel drive device according to claim 1, wherein the power conversion device has a plurality of cooling surfaces, and two or more cooling surfaces among the plurality of cooling surfaces come into contact with the cooling medium.

4. The wheel drive device according to claim 1, wherein the rotor is fixed to the inner peripheral side of the wheel, and
the stator and the power conversion device are arranged on an inner peripheral side of the rotor.

5. The wheel drive device according to claim 1, wherein the flow path has a first flow path to cool the power conversion device and a second flow path to cool the stator, and the cooling medium flows in the first flow path and the second flow path in this order.

6. The wheel drive device according to claim 1, wherein a battery is arranged in a rotation-axis direction of any of the rotor, the stator, and the power conversion device.

7. The wheel drive device according to claim 6, wherein a fan that generates wind for cooling the battery or the electric motor is provided on the inner peripheral side of the wheel.

8. An electric vehicle comprising the wheel drive device according to claim 1.

* * * * *